Figure 1:
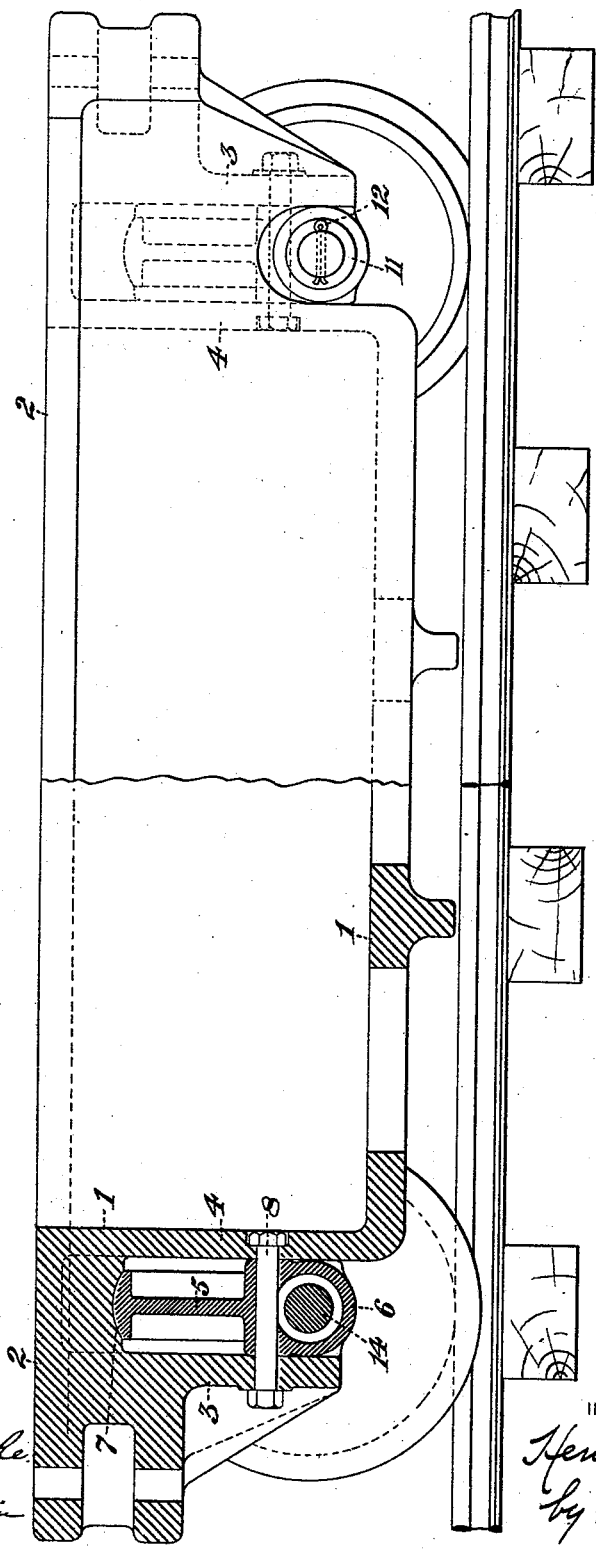

(No Model.)  2 Sheets—Sheet 1.

H. AIKEN.
CAR OR TRUCK.

No. 413,705.  Patented Oct. 29, 1889.

WITNESSES  INVENTOR.

(No Model.) 2 Sheets—Sheet 2.
H. AIKEN.
CAR OR TRUCK.
No. 413,705. Patented Oct. 29, 1889.
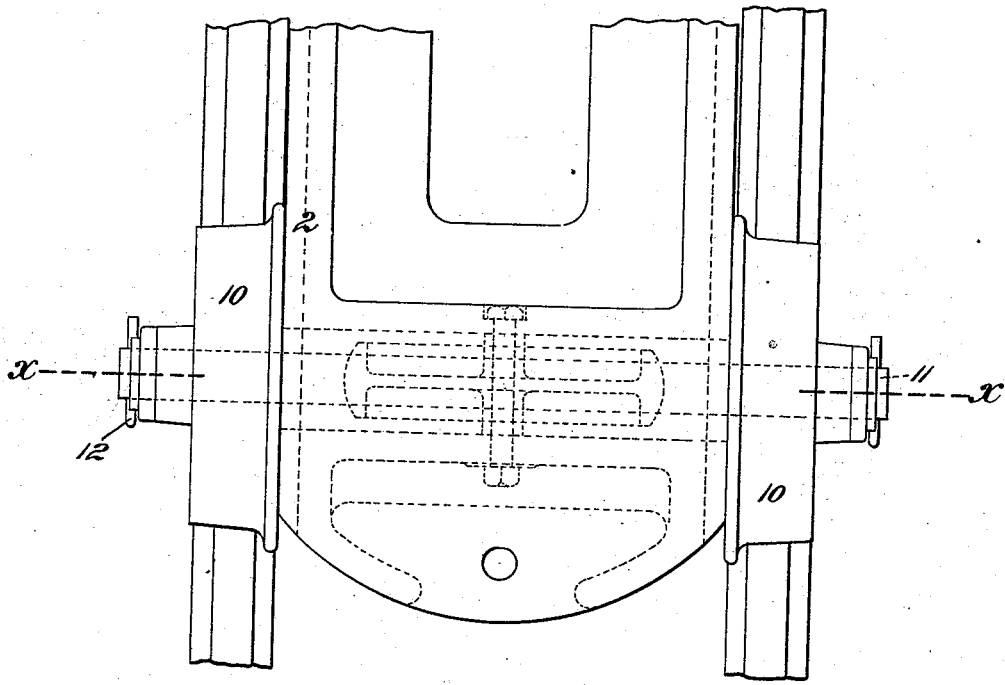
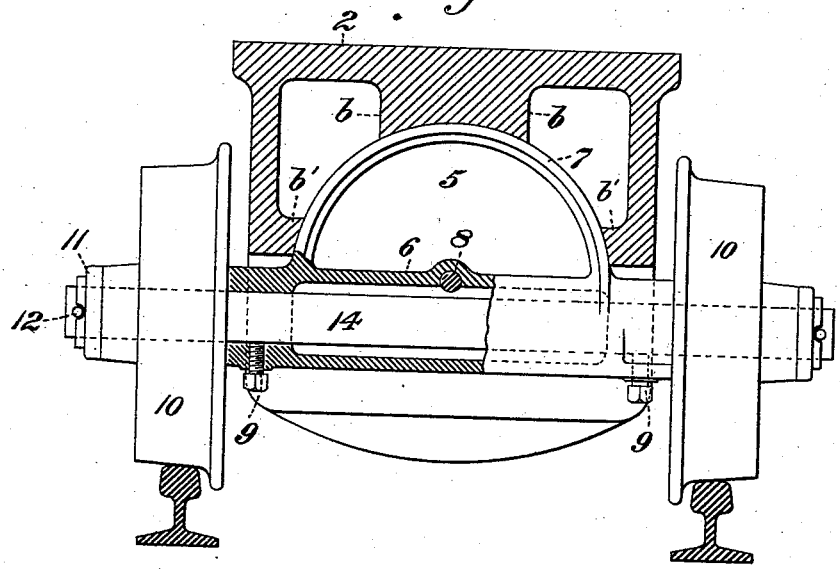
WITNESSES
C. M. Clarke
W. B. Corwin
INVENTOR.
Henry Aiken
by W. Bakewell & Sons
his Attorneys

UNITED STATES PATENT OFFICE.

HENRY AIKEN, OF HOMESTEAD, PENNSYLVANIA.

CAR OR TRUCK.

SPECIFICATION forming part of Letters Patent No. 413,705, dated October 29, 1889.

Application filed November 2, 1888. Renewed August 3, 1889. Serial No. 319,631. (No model.)

*To all whom it may concern:*

Be it known that I, HENRY AIKEN, of Homestead, in the county of Allegheny and State of Pennsylvania, have invented a new and useful Improvement in Cars or Trucks; and I do hereby declare the following to be a full, clear, and exact description thereof, reference being had to the accompanying drawings, forming part of this specification, in which—

Figure 1 is a side elevation of my improved truck, shown partly in vertical longitudinal section. Fig. 2 is a partial plan view thereof. Fig. 3 is a vertical cross-section on the line $x$ $x$ of Fig. 2.

Like symbols of reference indicate like parts in each.

I have designed my invention especially for application to those trucks which are used extensively in rolling-mills for the purpose of carrying ingots, molds, &c. From the nature of the construction and the manner of use of such trucks it is impracticable, or at least undesirable, to mount the body on springs, and it has therefore been customary to set the bed of the truck directly upon the axles. The tracks which are used in rolling-mills are generally very irregular, because they are often of considerable length and number, and the economic operations of the mill do not permit much attention to be given to their repair. The consequence is that when the tracks are uneven, the axles on which the wheels of the truck are mounted being rigidly connected with the bed, the wheels will not all ride upon the track, and the truck will therefore frequently travel over such uneven tracks on three wheels, producing disagreeable jolting and a racking of the track and the frame of the truck. My invention is designed to overcome these difficulties and to provide a truck which, although not furnished with springs, is adapted to travel evenly over defective and irregular tracks. For this purpose, instead of securing the axles rigidly to the truck, I secure them to frames, which are oscillatory laterally independently of the truck-bed and of each other, so that the axles will adapt themselves to the irregular levels of the track.

The body of the truck, as shown in the drawings, is or may be cast in a single piece of metal, and comprises a hollow frame 1, the shape of which is clearly shown in the drawings, at the top of which is a horizontal bed or platform 2. The reason for thus constructing the truck is to secure the desirable strength and rigidity. At the ends of the truck and on the under side are vertical recesses which are formed by vertical separated partitions 3 and 4, and within each of these recesses there are inwardly-projecting portions $b\ b'$ of the truck-body, the extremities of which are shaped so as to coincide with the arc of a vertical circle. These recesses are adapted for the reception of the vertical oscillatory axle-frames, which carry the axles of the truck and which serve to support the truck-body. The construction of these frames is shown in Fig. 3, in which one of them is illustrated. It consists of a hollow horizontal portion or sleeve 6, within which the axle 14 is set and to which it is secured by bolts 9, and a vertical portion 7, made with a flanged periphery of circular form and having a web 5, which connects with the sleeve 6. The periphery of the flange 7 is preferably curved transversely, so as to form the segment of a sphere, for the purpose of permitting a slight oscillatory adjustment of the frame endwise of the truck, as well as laterally, and the flange fits within the recess above mentioned against the edges of the circularly-disposed projecting portions $b\ b'$ of the truck-body, which form bearings for the flange. The truck-body is therefore supported entirely by the vertical axle-frames, and, as the peripheral bearings of the latter are made on circular arcs, the frames are capable of free lateral oscillation on the centers of these arcs. At these centers the axle-frames are connected with the body of the truck by bolts 8, and while these bolts form the centers of such oscillation the weight of the body of the truck does not bear thereon, but bears, as before stated, upon the peripheries of the frames and is through these frames transmitted to the axles. The bolts 8 serve the function merely of holding the parts together, so that when it becomes desirable to lift the truck from the track by a crane or otherwise the axles and wheels may be lifted with the body. The wheels 10 are set on the journals of the axle and are held thereon in the usual way by washers 11 and keys 12.

I do not desire to limit the scope of my invention precisely to the form and arrangement of parts which I have shown and described, since they are susceptible of modifications in various ways, such as will suggest themselves to those skilled in the art, though the construction which I have shown possesses certain inherent merits, and I intend, therefore, to make special claims thereto.

The invention is applicable also to various forms and styles of trucks or cars other than that which I have illustrated.

I claim—

1. In a car or truck, the combination, with the body, of axle-frames which support the body and are transversely oscillatory in vertical planes independently of each other, substantially as and for the purposes described.

2. In a truck or car, the combination, with the body, of a transverse axle-frame on which the body is supported, said frame having bearings on a circular arc against the body and being oscillatory transversely in said bearings, substantially as and for the purposes described.

3. In a truck or car, the combination, with the body, of a transverse axle-frame on which the body is supported, said frame having a periphery made in circular arc curved transversely and having bearings against the body in which it is oscillatory, substantially as and for the purposes described.

4. In a truck or car, the combination, with the body, of a transverse axle-frame on which the body is supported, said frame being set in a vertical transverse recess formed in the truck-body, having bearings against the body and being oscillatory transversely in said bearings, substantially as and for the purposes described.

5. In a truck or car, the combination, with the body, of a transverse axle-frame on which the body is supported, said frame being set in a vertical transverse recess formed in the truck-body, having bearings therein against the body and being oscillatory transversely in said bearings, and a pin connecting the frame and body at the center of such oscillation, substantially as and for the purposes described.

In testimony whereof I have hereunto set my hand this 24th day of October, A. D. 1888.

HENRY AIKEN.

Witnesses:
W. B. CORWIN,
H. L. GILL.